United States Patent [19]
Pedlow

[11] 4,189,619
[45] Feb. 19, 1980

[54] FIRE PROTECTIVE MASTIC AND FIRE STOP

[76] Inventor: J. Watson Pedlow, P.O. Box 33, Media, Pa. 19063

[21] Appl. No.: 872,820

[22] Filed: Jan. 27, 1978

[51] Int. Cl.² .......................... H02G 3/04; C09D 5/18; B32B 5/16; B32B 9/04
[52] U.S. Cl. .................................. 174/48; 106/18.11; 106/18.27; 106/18.36; 174/121 A; 252/5; 428/325; 428/494; 428/500; 428/538; 428/539; 428/921; 521/84; 521/85; 521/91; 521/907; 260/DIG. 24
[58] Field of Search .......... 169/48; 106/15 FP, 18.11, 106/18.12, 18.27, 18.28, 18.36; 252/5; 260/DIG. 24; 521/84, 85, 91, 907; 174/48, 121 A; 428/325, 494, 500, 538, 539, 921

[56] References Cited
U.S. PATENT DOCUMENTS

| | | | |
|---|---|---|---|
| 3,090,764 | 5/1963 | Ellis et al. | 260/DIG. 24 |
| 3,861,425 | 1/1975 | Clark | 428/921 |
| 3,912,671 | 10/1975 | Kondo et al. | 106/15 FP |
| 3,928,210 | 12/1975 | Peterson | 174/121 A |
| 3,940,549 | 2/1976 | Whittum et al. | 106/15 FP |
| 4,018,962 | 4/1977 | Pedlow | 174/121 A |
| 4,018,983 | 4/1977 | Pedlow | 174/121 A |

OTHER PUBLICATIONS

Yabuki et al., "New Types of Fire Retardant Materials and Their Application to Fire Protection of Cables", Dainichi-Nippon Cables Review Ltd., #61, pp. 56-71, Sep. 1976.

*Primary Examiner*—William R. Dixon, Jr.

[57] ABSTRACT

A fire protective mastic is provided, whose essential components are solids including a low fusing ceramic frit, hydrated solids having chemically bonded water which is released as a fire protective water vapor when heated, solids which expand or intumesce during the same heat application to form a porous, expanded or foamy insulating body, solids which have a fire break effect, such as antimony oxide and zinc tetraborate, and binder solids which are thermoplastic resins and serve to bind the solids into a flexible coating when applied, the binder solids being dispersed as an emulsion in water and mixed with the other solids to form a mastic. With further addition of water it is converted to a selected viscosity for application by troweling, coating or spraying. The mastic is applied as a coating or a precast boot upon single or grouped electric power and control cables to restrict fire propagation and to prevent self ignition of cables from fires due to overloading or other electrical faults, or from oil, waste or trash fire sources. The mastic is further usefully shaped into fire protective panels the latter of which, when dried, can be mounted as a protective wall insulating a section of cables passing from area to area as a fire stop. The total panel can be formed of the dried mastic, or the mastic can be coated upon one or both sides of insulating panels such as ceramic fiber boards, to further reduce the temperature gradient through the panel upon fire exposure and thus appreciably reduce the temperature on the cold side by 50°–70° F., thereby minimizing the danger of self ignition of gases or combustible materials such as cable jacketing, insulation or other flammable materials.

15 Claims, 6 Drawing Figures

FIRE PROTECTIVE MASTIC AND FIRE STOP

This invention relates to a fire protective mastic and fire stop for electrical cables and neighboring wall junctures or partitions through which the cables pass, the mastic comprising protective water vapor-evolving substances, other substances which intumesce or expand, and still others which glaze with sufficient heat and form a stable protective porous coating having a fused ceramic casing upon the electric cables and fire stop panels, when exposed to fire. The mastic is also useful as a precast boot for mounting upon cables or splices, or as an air and fire seal or caulk disposed upon or between cables, the mastic filling cracks or crevices between cables or panels and cables, and serves as a coating upon fire stop panels and upon neighboring walls, and for wall paneling per se through which electric cables pass as a fire protective wall and in which the paneling or boot per se may be formed of the precast dry mastic.

The mastic hereof contains large quantities such as 60 to 85% of a mixture of solids of several types, each with a distinct function to provide in combination a superior fire protective effect. The solids are formed into a mastic by a binder resin dispersed in water in quantity to form a coherent coating when dry, whereby the solids and the dispersion may be evenly mixed. Additional quantities of aqueous diluent may be added in the mixing, for conversion of the dispersion of resins and dry solids to a trowelable, coatable or even sprayable composition, as needed to provide the requisite fluidity for application.

Some of the solids include intumescing or decrepitating substances, typically cenospheres, which are fly-ash, inorganic particles evolved as dust from coal combustion and are very light, volatile and expandable with heat, like tiny fused ballons. It is that expansion of such gas evolving substances in combination with other vapor producing substances mixed therewith which, when the composition is heated under fire exposure at temperatures above about 1,000° F. to activate the intumescing components and release vapors which convert the composition from a thin layer coating on a cable or panel to its expanded heat insulating form. Such intumescent solids are present in the range of 5-40%, preferably about 7-25%.

Other solids present in the composition are of a chemical hydrate character, having chemically or physically combined water, such as hydrous oxides, silicates and other hydrated substances which firmly bond the water and which decompose with the heat of a fire and evolve large quantities of cooling, non-corrosive oxygen displacing and fire-protective water vapors. Such hydrous oxides are typically hydrous alumina, magnesia and the other water evolving hydrous oxides and silicates. These hydrated components are used in quantity of 10 to 40% and preferably in quantity of 15 to 30%.

Still other solids in the mastic comprise a heat fusible ceramic frit which, when heated sufficiently upon an outer surface of the expanded coating, exposed to high fire developed heat, glaze over and encase the expanded dry mastic as a fire protective film thereon, protecting the expanded coating and insulating the cables, or in or upon the fire stop panels or boots. Such frit generally is a low fusible glass, typically a borosilicate glass frit generally fusible in the range of about 700° to 1,500° F. It is usefully used in the range of about 5 to 40%, and preferably about 10 to 25%.

The composition includes a thermoplastic resin as a binder dispersed in water, the aqueous dispersion being mixed evenly with said solids to form the mastic. The thermoplastic resin is present in quantities sufficient to form a flexible binder for the mastic composition when dry, as a coating upon the electrical cables or panels, or to bind the panels or boots upon drying into a strong structural form. Sufficient additional water is added in the mixing as stated, for supplying requisite fluidity for application. The resinous solids are present in the quantity of about 15 to 40% of the dry composition, preferably 20 to 30%. Such thermoplastic substances may be any useful thermoplastic binder resin, which is halogen-free, but which may melt and flow by heat developed during fire and allow the composition to expand to a heat insulating coating. The typical resins for this purpose are halogen-free to avoid decomposition and release of noxious and corrosive halogen gases, and may be typically polyvinyl acetate, polyacrylic acid, polyacrylic lower alkyl esters, such as methyl or ethyl esters thereof, polymethacrylic acid and its lower alkyl esters, such as methyl and ethyl esters thereof, as well as mixtures of such acrylic resins, natural and artifical rubber latices, each as dispersions in water, said dispersions usually having from 25 to 75% of resin solids therein, usually 45 to 65% resin solids, the balance being water with minor quantities of dispersing agents.

The composition further includes small quantities of combustible fiber, such as cotton, rayon, aramide or the like, to provide a temporary coating stability for the wet or molten mastic. For this purpose the fiber need not be fire proof and may burn as the composition becomes heated when exposed to fire and will only be used in minor quantity, generally less than 5%, usually 0.5 to 2.0% to supply this temporary binding function.

The composition will further contain among the solids, such fire retardant substances as antimony oxides, which develop vapors with heat along with the protective water vapors evolved. Antimony oxide also is a low fusible component and contributes to the formation of the fused frit casing during fire exposure. Another fire retardant solid is zinc tetraborate which, through synergistic action, further improves the fire-retardant character of antimony oxide in the mixture. These fire retardant antimony oxides and zinc tetraborates are each used in quantity of 2 to 15%, preferably 4 to 10% and 5 to 10% respectively.

Other solids present in the composition are each added for a specific minor function and will be present generally in quantity from about 0.1 to 10%, some, generally less than 2%, adequate only to perform the function. Thus, other solids may consist of emulsifying agents, typically Triton X 100, such as octylphenyl-polyethoxy ethanol, in quantity of about 0.5 to 5%. Rust inhibitors, generally in quantity of about 0.2 to 5%, such as potassium polyphosphoric acid esters. Preservatives, such as fungicides, which are mercury complexes, in quantity of about 0.01 up to about 0.05. Viscosity controlling agents, such as alkali metal salts of polycarboxylic acid or oil based liquid polysiloxanes in quantity of 0.2 to 5%. Thickeners, such as hydroxy ethyl cellulose and a clay type inorganic gelling agent, such as attapulgite clay in quantity of 0.1 to 2%. These several minor additive components for these functions are used in quantity sufficient for the stated function, and each generally will be present in quantity of less than 10%, and usually from 0.2 to 2%.

Thus the vapors evolved are non-corrosive gases consisting of water vapor, antimony oxides and minor heat decomposition vapors of the resin and fiber. Such halogenated resins as release halogen, typically chlorine, such as polyvinyl chloride or numerous halogenated plasticizers as also are commonly used in the fire proofing art and whose destruction and release by heat during cable failure, as by arcing, short circuitry or destruction by fire from other sources in the neighborhood of the cables and protectively coated with such fire proofing substances, as release halogen, are avoided, whereby the composition hereof releases no noxious and corrosive halogen gases.

In forming this mastic mixture, the binder emulsion of resin in water is further mixed with the dry intumescing and fire proofing solids, and reduced with a small additional quantity of water as needed to homogeneously mix the filler solids and emulsion for application. The mastic dries and sets by evaporation of the water to a thin ⅛ to ¼" thick flexible coating on the electrical cables and wall panels forming a heat insulating and fire proofing mastic as well as an effective heat insulating air seal and fire stop in panel form at interrupting walls through which the cables pass, at thicknesses of ¼" to 1½".

The mastic hereof is intended both as moldable mixture for forming into fire proofing boots to be installed upon cable joints and splices or on dry wall panels through which electrical cables may pass, or as a thick suspension in water to be applicable as a protective mastic filler and coating body upon and about a group of cables, entering, leaving and passing through a floor slab or fire wall, which may be formed of such or other fire protected wall panels. The panels can also be formed as a laminate of rigid panel board such as ceramic fiber, gypsum or Transite, having such mastic coat applied and dried upon one or both surfaces thereof.

In prior applications of other heat and fire protective insulation substances upon electrical cables, these, according to my prior U.S. Pat. Nos. 4,018,962 and 4,018,983 have been loosely wound as tape or mounted as a boot about a cable joint as fire protective means while or after the cables are assembled, both the tape and boot being relatively non-coherent to the cable. It was also proposed in U.S. Pat. Nos. 3,642,531 and 3,928,210 to coat cables as an aqueous emulsion of resins, including essentially halogen evolving plasticizers, the heat insulating effect of such coating compositions being largely provided by inorganic fiber which functions comparatively poorly for this purpose, and the halogen gas evolved with heat decomposition is highly corrosive and toxic, a source of substantial danger and damage to personnel and equipment. Equally important, such compositions coat poorly and crack upon drying, and, under the destructive effect of high temperature, tend rapidly to peel, flake or powder away from the protective position upon the electrical cables which they are intended to protect. Such coatings, in contrast to the present fail to adequately meet the important fire and heat insulating needs to prevent destruction of cable jacketing and insulation-protecting critical power and multiple conductor control cables and to prevent propagation of fire along grouped cables in trays and through wall and floor penetrations at flaming temperatures often exceeding 1,900° F.

The invention is further explained with reference to the drawings wherein.

Figure 1:
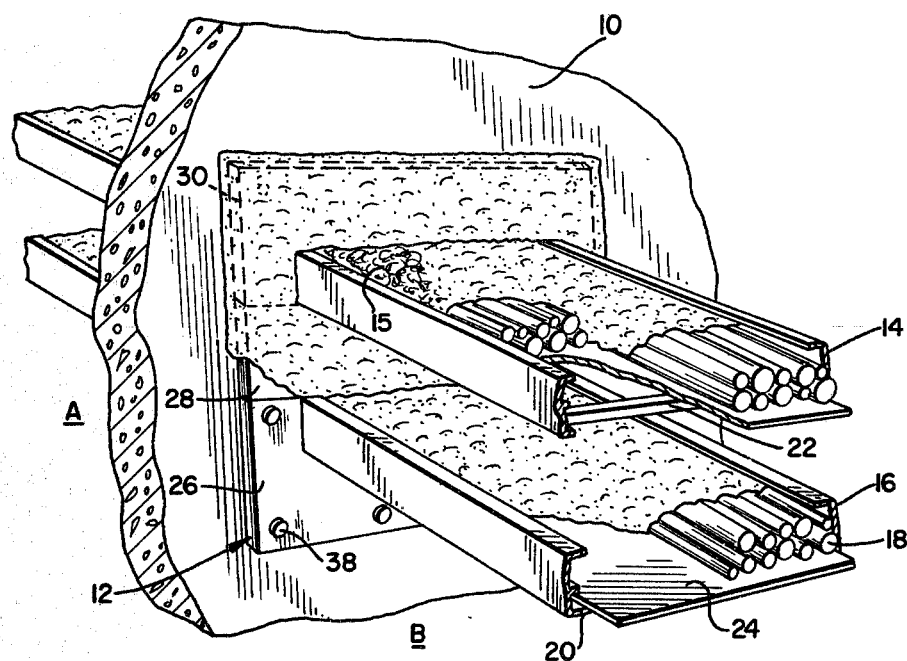
FIG. 1 shows a perspective of groups of mastic covered cables passing through a wall which may be protected by the fire stop paneling and mastic hereof.

Refering to FIG. 1, a wall 10 of concrete or masonry separates spaces A and B as a partition for normal structural purposes and has a rectangular opening 12 cut therein for passage of a tier of trays 14 and 16 which support and partially enclose electrical cables 18. These cables are conventional groups of power or multiple conductor control cables mounted, insulated and jacketed for purposes of electrical insulation and moisture imperviousness. Thus the cables may carry critical communication circuitry or conduct electrical power, ofttimes of high voltage. In any case, any building construction has many cables as a valuable part thereof and, for whatever electrical purpose they serve, great damage can be done to the structure and cables by electrical faults, such as short circuitry or extraneously caused fire, such as by exposed to flaming combination of oil, trash or the like, developing destructive heat in the cables. Again, the cables themselves are valuable in terms of the numerous communicating conductors and the redundant circuits which must be provided, as well as importance of wires which may be a part of the cables per se, all being desirably protected. The coating hereof effectively protects cables longitudinally or vertically against propagation of any fire, regardless of source, so that fire cannot damage redundant control and power circuits and penetrate into critical control areas.

Finally, it is desirable not only to encase the cables by fire preventive mastic, but also to protect one side of a partitioning wall 10 as a fire stop with insulation and insulating panels formed by the combination of a fire stop panel and mastic hereof, thus to prevent transfer of heat, flame or evolved gases to the opposite wall side of the fire stop.

Electrical cables 18 therefore, and for this purpose, are mounted in supporting trays 14 and 16, which may comprise channel irons 20, connected by a metalic ladder, expanded mesh or solid framework 22 which can terminate or pass through the opening 12 of the wall 10. The layers of cables can be further supported from below by a heat resistant panel 24 which may be a precast panel of the mastic material hereof or other type of fire proofing tray liner.

At the wall opening 12 a further set of wall panels 26, 28 and are mounted each with cut-away portions (not shown) to fit over the cables and close the wall opening 12, as well as to closely close any spaces between cables passing through the wall. The cables pass directly through or themselves may each be enclosed in a supporting heat resistant metal sleeve or conduit tube (not shown). It is sometimes desirable to cover the interstices between the cables with loosely matted inorganic fiber which forms a filler for large spaces directing and supporting the mastic to close engagement with the cables and for allowing an overall coating as a bed of cables. Optionally, however, the mastic itself may be supplied alone to fill the space between the cables through the entire depth above the lower panel 24 up to a point above the surfaces of the cables as shown in FIG. 1, whereby, the cables become fully embedded within the dried mastic. The mastic can be sprayed over the grouped cables as a ⅛" minimum thickness coating.

Figure 5:
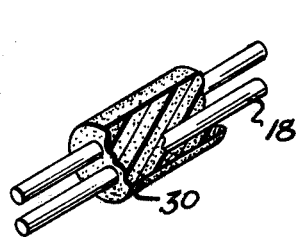
FIG. 5 illustrates a detail of a conduit carrying cables which is filled with mastic.

Moreover, the mastic 30 is extended to cover the paneling 26,28 and to fill all of the cracks and crevices therein, whereby the cables pass through the paneling and through the opening 12 of the wall 10, each crack, opening or space being filled with mastic. It may also be applied within conduit carrying cables to fill or plug the same as shown in FIG. 5. Moreover, the mastic is applied over the top of the cables and for secure closure of any cracks between panels, both around the panel edges as well as any spacing or cracks between the adjacent panels.

As shown in FIG. 1 two trays of cables pass through the wall 10 with the construction described. The cables may be present in any number and arranged in the trays in any grouping. Additional cables may be passed through the wall of that construction by cutting through the light pre-cast panels, cutting away some of the mastic and penetrating through the panel in a circular cut in a manner to accommodate one or more additional cables to be added from time to time, and the new cable being readily thrust through a newly formed cut portion. The newly added cables are coated with more fresh mastic and any cracks or crevices remaining about the newly added cables in the panels are further coated and sealed with more mastic, whereby additional cables are easily added from time to time.

Figure 2:
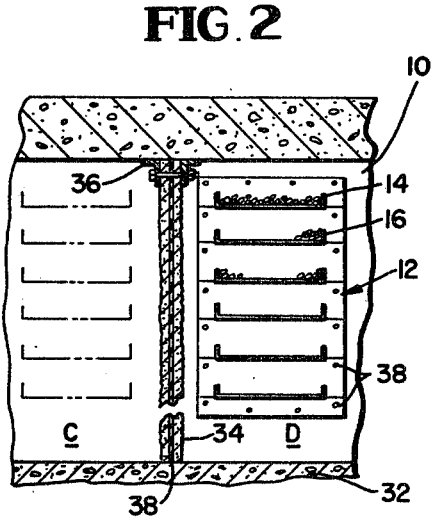
FIG. 2 is an elevation of several trays of cables arranged in a vertical tier as they will pass through a fire wall protected by the paneling hereof.

As shown in FIG. 2 many trays can be assembled in a tier of trays passing to or through the wall, depending upon the wall size according to the size and height needed above the floor 32, whereby two stacks or more trays as may be needed to accommodate all of the cables can be used. In that case the separate stacks of cables C and D may be further separated by a partitioning wall 34, in which larger panels of the mastic hereof are assembled as a separating partition 34 and the partition may be supported as shown by angle iron brackets 36. It may be useful to separate the panels by a central laminated layer 38 which may be of metal wire or glass fiber or other reinforcing material.

The fire stop wall may be formed of fire proof paneling material, resistant to heat, whereby to operate as a fire-protective shield or partition between the opposite wall sides of spaces, as an easily assembled fire stop partition through which a group of cables pass, whereby the protective wall prevents heat and flame transfer, as well as the transfer of noxious vapors or smoke to its opposite wall side where continuing or redundant circuits may be installed. Particularly, the fire stop wall is intended to prevent transfer of heat, to the wall side opposite to that facing fire exposure and remains relatively cool on the opposite wall side from the high temperatures that may develop from a cable failure. The paneling may be formed of other useful pre-cast fire proof materials, but often is of the same dried mastic material as the mastic, also being applied as a coating upon the cables hereof, the mastic being cast into panels for assembly as dried panels into the fire stop wall hereof.

Figure 3:
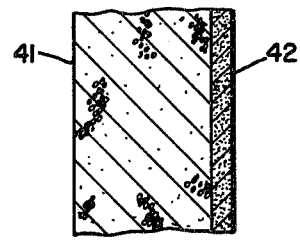
FIG. 3 is a detail showing the mastic as an outer lamina layer upon a conventional heat resistant wall board base.

FIG. 3 illustrates a panel board which can be of any commercial ceramic fiber rigid insulating board 40, and which has coated thereon a thin ⅛ to ¼" coating 42 of the mastic hereof.

Figure 4:
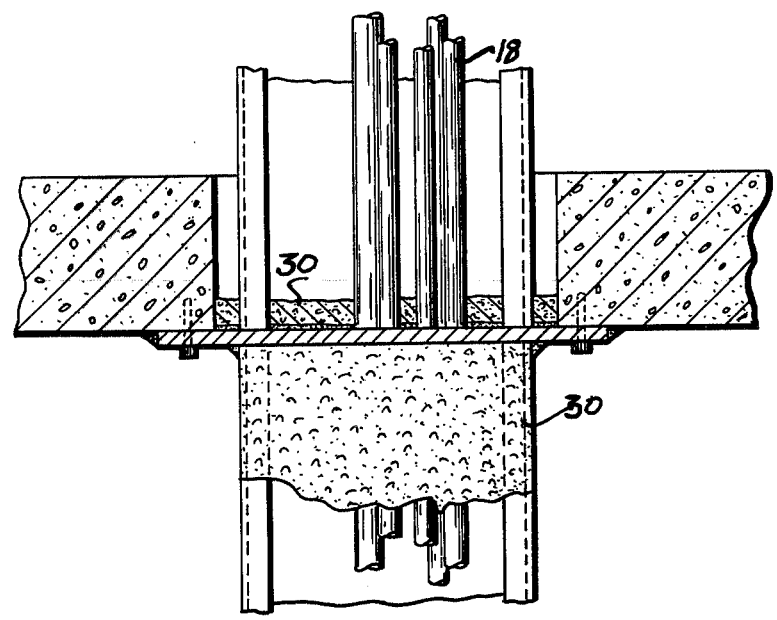
FIG. 4 is a detail showing the mastic poured about cables passing through a floor opening.

As shown in FIG. 4 cables disposed as groups or individual cables disposed as groups or individual cables in sleeves are mounted pass through a floor slab 10 with the mastic hereof poured about and with the sleeve to form an air seal as well as a fire stop. FIG. 5 shows the detail wherein a conduit which may penetrate a wall or floor, and carrying one or more cables is filled with a mastic, applied by caulking or troweling.

The present composition is highly heat and fire protective. It evolves only non-corrosive vapors, such as water vapors, antimony oxides and zinc tetraborate. It produces a porous heat expanded heat insulating body protective of the cable when destructive heat is applied, the coating being developed by expansion of the intumescent substances and evolving gases which convert the coating to an expanded, porous, heat insulating body. The coating further contains a heat fusible frit which forms a glaze, strengthening and protecting the coating despite very high temperatures, whereby the coating is low heat transfering and does not powder, flake or peel off the surface of the cable to which it was applied.

Theoretically, it appears that during the heating process when ignition and combustion take place through electrical faults such as arcing or short circuitry or other source of high heat evolution, the coating first in the presence of heat softens the thermoplastic component. The intumescing substances such as cenospheres and the hydrous oxides with enough heat begin to expand as well as to evolve water vapor. The antimony oxide at higher temperatures can evolve its vapors. The fiber which is ultimately heat decomposable, operates in the cold to help bond the composition into a firm, strong and crack-free coating while it dries. As the initial heating is applied, the thermoplastic binder melts, but the fiber tends to prevent the resin from flowing away, maintaining the integrity of the composition while it steadily expands with the heat. Ultimately the fiber and the resin may be charred to an infusible porous mass, developed by the expanding intumescing solids. The expanding mass carries much of the fusible frit to the coating surface, where at high heat exposure temperatures, the frit can fuse protectively as a refraction shell over the porous mass to prevent further heat passing into or from central or inner cable portions. The glazed frit serving further as a reinforcing shell to prevent further ingress of great heat and prevents the mass from peeling or flaking away from its protective position about the cable.

The composition functions similarly either as a component of the total panel body or as an even outer layer on the paneling, whereby the mastic substance thereof will expand with heat protectively as a fire barrier or stop. One side of the panel of great heat exposure absorbs and prevents passage of heat, acting as a heat and fire stop partition or protective wall, allowing little heat to pass to the opposite side which remains comparatively cool. A similar effect is achieved both by using ordinary non heat conductive paneling substances such as commercially available insulating board of ceramic fiber which, however, is coated with the mastic hereof to improve the wall paneling as a fire stop through which the cables pass.

The water component hereof is free water. The resinous emulsion may be quite thick and more water to that contained in the resinous emulsion is usually added merely supplied as free water in quantity sufficient to adjust the mixture to a trowelable down to sprayable mastic as desired. For purposes of easy distribution of the water, various surfactants such as Triton X 100 an alkylphenoxy, polyloweralkyleneoxy, loweralkanol in which the alkyl has 1–2 carbon atoms, and the product may contain from about 10–40 alkyleneoxy groups.

The resinous binder hereof is dispersed as an emulsion in water in concentration of 45 to 65% resin solids the remainder being water. Minor additives may be supplied to improve the body and flexibility, typically an anti foam agent such as Colloid 677, an oil based polysiloxane, thickeners such as hydroxyethyl cellulose, rust inhibitors such as Strodex PK-90, a potassium polyphosphoric acid ester, and preservatives of an anti-fungal nature, such as Troysan, an organic mercurial complex. Such additives will be used in the minor quantity 0.1 to 5% and sometimes as high as 10%, but generally less than 1%, and usefully less than 0.2% such as 0.1 to 1%, and are generally mixed in a carrier such as a propylene glycol in quantity usually less than 2%, such as 0.5–1%.

fastened across the opening 10 with metalic fasteners 38 as shown. A preferred form is a single layer of ⅛ to ¼ inch thick coating upon a board of ½ to 1 inch thick body.

The cables themselves are encased in coating, which may be thin and flexible or may be applied as a filler mastic between a group of cables which pass through the paneling, cut with holes to allow cables or trays having a number of separately spaced cables to pass through from side to side of the fire stop wall, and the cracks and crevices about each cable are then filled with the mastic. Thus the mastic is applied by spraying, trowelling or brushing upon the cables, between the cables, upon the fire stop wall as a coating and as the paneling substance from which the wall per se is formed.

The following examples illustrate the practice of this invention:

EXAMPLE 1

Four hundred and sixty-two pounds of vinyl acrylic polymer dispersed in water in quantity of about 277 lbs of polymer, the remainder of said emulsion being water and additives. The additives consist of 13 lbs of propylene glycol, 6 lbs of Colloid 677, oil based liquid polysiloxane, 1.5 lbs of hydroxy methyl cellulose, 6.5 lbs of

| THE FOLLOWING IS A GENERAL FORMULA FOR THE MASTIC | WEIGHT PERCENT Preferred | TOTAL RANGE |
|---|---|---|
| WATER (added to control body | 5–15 | 1–30 |
| RESINOUS DISPERSION | | |
| Halogen-free resin solids | 20–30 | 15–40 |
| ADDITIVES | | |
| Common surfactant, i.e. Triton X 100, octyl phenyl polyethyleneoxyethanol, Tamol sodium polycarboxylate; Anti-foaming agent, i.e. colloid, oil based polysiloxane; thickener QP 4400 hydroxy ethyl cellulose; Strodex PK 90, potassium polyphosphoric acid methyl ester; attapulgite gel, diatomaceous clay; fungicidal preservative, Troysan CMP acetate mercurial complex, propylene glycol. | 0.2–5 | 0.1–10 |
| ORGANIC FIBER | | |
| Typically aramid, rayon, wool or cotton. | 0.5–2.0 | 0.1–5 |
| WATER VAPOR EVOLVING | | |
| Hydrous oxides (inorganic hydrates having chemically combined water evolvable only under fire conditions). | 15–30 | 10–40 |
| INTUMESCENTS | | |
| Cenospheres | 7–25 | 5–40 |
| FIRE PREVENTATIVES | | |
| Zinc Tetraborate | 5–10 | 2–15 |
| Antimony Oxide | 4–10 | 2–15 |
| FRIT | | |
| Ceramic Glazing Solids (typically low-fusing borosilicate glasses generally calcium, magnesium, zirconium, borosilicates (generally lead-free). | 10–25 | 5–40 |

In forming the composition, the dry components are mixed and evenly blended with the plastic to form a heavy mastic, adding a small quantity of water in the range stated, sufficient to bring the mastic up to an applicable viscosity upon the cables assembled and panels as shown, filling all of the openings, cracks and crevices. The mastic formed as described may be extruded into sheets of desired thickness, such as ¼–1½ inches thick. The wet extruded panel may be set merely by drying evaporation of the water at ambient temperatures. It is sometimes preferred to form the panels thinner, sometimes as thin as ¼ inch paneling and form panels in pairs of lamina of 2, 3 or more, as desired, and rayon fiber, 1.5 lbs of Strodex PK 90, potassium polyphosphoric acid ethyl ester and 0.5 lbs of a mercurial complex preservative. The entire mixture being a viscous dispersion in water. Separately, a dispersion of 1.0 lbs of Triton X 100, which is octyl phenyl polyethyleneoxyethanol, and 5.7 lbs of Tamol, sodium salt of polycarboxylic acid, are dispersed in 50 lbs of water. The aqueous solution of dispersing agents and additives is used to dilute the first resinous emulsion. Thereafter dry powders consisting of 190 lbs of hydrous aluminum oxide, 90 lbs of cenospheres, 80 lbs of zinc tetraborate, 68 lbs of antimony oxide and 163 lbs of frit, a low temperature borosilicate glass essentially lead-free calcium silicate ceramic glass, available from the Ferro Corporation as FB282. Thickeners such as Attagel 40 are added to the extent of 10 lbs to control consistency. The dried powders are mixed into the diluted liquid emulsion to form a sprayable mastic which is sprayed upon electrical cables and upon fire stop panels. The mastic dries at ambient temperatures in air to form approximately a ⅛ to ¼ inch thick, on average, coating, firmly and flexibly adherent to the cable surface. The base of the panel is commercial ceramic fiber board, such as Kaowool, Duraboard board of 1 inch thickness.

The coated panel of this example, about 1" was tested according to ASTME 119 by supporting the panel above a flame having an average firing temperature of 1725° F. The flame impinges against the coated side and the temperature of the uncoated side was measured to determine the heat transfer effect. It was found in a series of three hour burning tests that the maximum temperature measured on the uncoated side was about 330° F. for the board with a ¼" coating the heated mastic generated only a small amount of smoke, the coating remained well adherent to the insulating board. For a ⅛" thick coating with mastic the average transferred temperature was 350° F. In a comparision with a competitive composition the temperature for a ⅛" coating was 380° F., and for an uncoated board the temperature was 400° F. In separate tests it was found that a standard vertical burn test (IEE-383) applied to grouped cables coated with this mastic was self extinguishable after removal of the flame source; there was no apparent damage to jacketing or insulation during a 20 minute burn in which about 70,000 BTU per hour was applied to the coated cables, and there was no flame propagation after removal of the burner. The coating of this example is flexible, and after drying, the coated cables can be bent without cracking of the coating.

EXAMPLE 2

A similar mastic as example 1 was formed using a commercial mixture of polyacrylate resins dispersed in water available in UCAR 163, having similarly about 60% of polyacrylate total solids, of which 58% was mixed polyacrylics, the remainder being additives as in example 1. This thick resin was similary diluted with water and additives, thinning the thick emulsion and into which is added the powders as example 1. The mastic coated upon the cables as shown is flexible and fire resistant by the same tests, and is highly heat insulating, a 1" thick panel coated with the mastic to a thickness of ⅛" average, and similarly exposed to a 1725° F. exposed flame for a three hour time period, transferred the average temperature to the opposite side of about 345° F. over the test period. Seven conductor control cables coated with a thickness of ⅛" min. were still flexible, and, in a special Factory Mutual test, were immersed and cycled in and out of 60° C. 1% salt water solution for thirty days, and the coating was unaffected and remained firmly adherent. In each of the tests examples 1 and 2 the heated surface had a ceramic glaze and the coating had expanded to a porous film of about twice the original applied and dried film thickness.

EXAMPLE 3

The mastic of example 2 was formed by similarly thinning the commercial resinous dispersion of polyacrylic resins, reducing the extra quantity of water used in the thinning to 15 lbs, whereby, the mastic was thicker and trowelable. In this form it was cast into panels and used as a fire stop panel in a test by exposure to a 1700°–1750° F. flame. The maximum temperature on the cool side of a 1" panel was 285° F., on average over a three hour test period, the panel expanding and charring in the area of the applied heat, but conducted no flame when the burner was withdrawn.

As shown in FIG. 4 one or more cables can be passed vertically through a masonry floor, for which purpose they may be mounted within a pre-formed sleeve and the mastic poured around the sleeve. The mastic may also, as shown in FIG. 5 be filled into the body of the sleeve or applied only in separated portions thereof for support, and sealing the cables for prevention of gas flow between spaces separated by the floor. The mastic will be filled or applied around the outside of the sleeve as shown to a selected depth, and other fire stop paneling as shown in FIG. 1 may also be used to close the floor opening.

Figure 6:
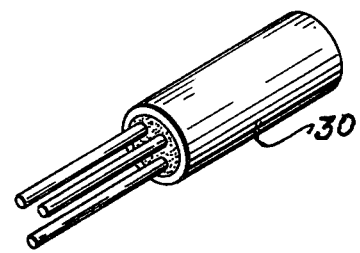
FIG. 6 shows a section of a mastic coated cable.

FIG. 6 shows a single cable having a dried precoated film of mastic thereon, a form in which the cable itself may be handled.

Various modifications will occur to those skilled in the art, particularly other hydrous oxides and other known ceramic frits may be substituted, but no halogen containing substance will be used.

Accordingly, it is intended that the disclosure be regarded as exemplary and not limiting, except as defined in the claims.

I claim:

1. Fire protective heat insulating mastic for coating upon electrical cables and for forming or coating upon fire protective panels to be mounted in neighboring structures near electrical cables, said mastic comprising an essentially halogen-free mixture of solids and thermoplastic binder resins dispersed as an emulsion in water, said solids including heat intumescing and expanding substances in approximate quantity of 4 to 25% to expand the mastic to porous heat insulating form, ceramic frits in approximate quantity of 5 to 40% to provide a ceramic glaze upon the surface of the dry expanded mastic when exposed to high temperatures developed by fire, hydrated substances in approximate quantity of 10 to 40% and having bonded water evolvable only by application of sufficient heat to decompose and evolve water vapors, fire protective solids of the character of antimony oxide and zinc borate activated by the heat of a fire to a fire protective form in approximate quantity of each of about 2 to 15%, and a resinous thermoplastic binder in approximate quantity of 5 to 40% to bind said solids to a flexible film in coated form of the mastic, said binder being dispersed as an emulsion in water, there being sufficient water in the emulsion to convert said solids into a fluidized form for application as a coating upon said cables and panels, said percentages being by weight, the said solids quantity being based on the total solids of the composition.

2. The mastic composition as defined in claim 1, said mastic further containing a small quantity, less than about 5% of organic fiber said composition further containing from about 1 to 10% of emulsifying agents, rust inhibitors, fungicides, viscosity controlling and thickening agents.

3. The fire retardant mastic as defined in claim 1, wherein the binder resin solids are in the range of 20 to 30%, dispersed in water, being substantially 45 to 65% resin solids and 55 to 35% water, the low fusible solids are ceramic frits in quantity of 10 to 25%, the hydrated substances are hydrous oxides in the range of 15 to 30%, the intumescing and expanding substances are cenospheres in the range of 7–25%, said mastic further containing a small quantity of about 0.5 to 2.0% of organic fiber, and the fire retardant antimony oxide and zinc tetraborate are each present in quantity of 4 to 10% and 5 to 10% respectively.

4. The mastic composition of claim 1, wherein said resin binder is an emulsion of a member of the group consisting of polyvinyl acetate, polyethylacrylate, polyloweralkylacrylate, polyloweralkylmethacrylate, polyacrylic acid, polymethacrylic acid and mixtures of said acrylate resins, rubber latices dispersed in water, the dispersion being 45 to 65% of said resinous solids and the remainder substantially water.

5. The mastic as defined in claim 1, wherein the intumescing solids are cenospheres, the ceramic fusible frit is substantially borosilicate glass and the hydrated substance is a member of the group consisting of hydrous alumina and hydrous magnesia.

6. A fire stop panel comprising a moulded board formed of the dried mastic as defined in claim 1.

7. A fire protected electrical cable having a heat insulating coating of a mastic as defined in claim 1.

8. A fire protective panel, comprising a heat insulating board having an outer coating of a mastic as defined in claim 1.

9. A fire stop comprising a wall through which electric cables pass in groups, said cables being disposed as separated cables in trays and passing through an opening in said wall, each of the cables in said trays being surrounded and separated by a dry coating of a fire protective mastic as defined in claim 1 the wall being closed about said cables by fire resistant panels filling said opening and shaped to fit about the cables and trays passing therethrough, the crevices and cracks between panels, trays and cables being filled with said mastic.

10. The fire stop as defined in claim 9, wherein said panels comprise an essentially halogen-free mixture of solids and thermoplastic binder resins dispersed as an emulsion in water, said solids including heat intumescing and expanding substances in approximate quantity of 4 to 25% to expand the mastic to porous heat insulating form, ceramic fusible frits in approximate quantity of 5 to 40% to provide a ceramic glaze upon the surface of the dry expanded mastic when exposed to high temperatures developed by fire, hydrated substances in approximate quantity of 10 to 40% and having bonded water evolable only by application of sufficient heat to decompose and evolve water vapors, fire protective solids of the character of antimony oxide and zinc borate activated by the heat of a fire to a fire protective form in approximate quantity of each of about 2 to 15%, and a resinous thermoplastic binder in approximate quantity of 5 to 40% to bind said solids to a flexible film in coated form of the mastic, said binder being dispersed as an emulsion in water, there being sufficient water in the emulsion to convert said solids into a fluidized form for application as a coating upon said cables and panels, said percentages being by weight, the said solids quantity being based on the total solids of the composition.

11. The fire stop as defined in claim 10, wherein the panels are a laminate having an outer laminar coating of said mastic.

12. An insulated electrical cable having an outer coating of a fire protective mastic as defined in claim 1.

13. A plurality of insulated electrical cables, each separated from the other embedded in a dried mastic as defined in claim 1.

14. A plurality cables embedded in dried mastic as defined in claim 1, said mastic being further encased in a sleeve.

15. A fire protective panel formed of molded dried mastic composition as defined in claim 1.

* * * * *